(12) United States Patent
Jacobs et al.

(10) Patent No.: US 10,313,358 B2
(45) Date of Patent: Jun. 4, 2019

(54) SYSTEMS AND METHODS FOR PROXIMITY IDENTITY VERIFICATION

(71) Applicant: Capital One Services, LLC, McLean, VA (US)

(72) Inventors: Drew Jacobs, Arlington, VA (US); Hannes Jouhikainen, McLean, VA (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 15/666,318

(22) Filed: Aug. 1, 2017

(65) Prior Publication Data

US 2018/0041518 A1 Feb. 8, 2018

Related U.S. Application Data

(60) Provisional application No. 62/370,094, filed on Aug. 2, 2016.

(51) Int. Cl.
*H04L 29/08* (2006.01)
*H04L 29/06* (2006.01)
(Continued)

(52) U.S. Cl.
CPC .......... *H04L 63/107* (2013.01); *G06Q 50/01* (2013.01); *H04L 63/08* (2013.01); *H04L 63/0876* (2013.01); *H04L 67/18* (2013.01); *H04L 67/22* (2013.01); *H04W 4/02* (2013.01); *H04W 4/029* (2018.02); *H04W 4/21* (2018.02); *H04W 12/06* (2013.01)

(58) Field of Classification Search
CPC ... H04L 63/107; H04L 63/0876; H04L 67/18; H04L 67/22; H04W 4/02
See application file for complete search history.

(56) References Cited

U.S. PATENT DOCUMENTS 8,688,980 B2 * 4/2014 Davis .................... G06F 21/88
713/166
9,350,717 B1 5/2016 Siddiqui
(Continued)

OTHER PUBLICATIONS

European Search Report for EP Application No. 17184542.3-1870, dated Oct. 11, 2017 (8 pages).

*Primary Examiner* — Khoi V Le
(74) *Attorney, Agent, or Firm* — Finnegan, Henderson, Farabow, Garrett & Dunner, LLP

(57) ABSTRACT

Systems and methods are provided for authenticating a user of a computing device. An example system includes a memory storing instructions, and a processor configured to execute the instructions to receive an authentication request from a user of a computing device, determine a context of the authentication request, determine a physical location of the user, and perform, based on the context of the authentication request and the physical location of the user, an associate proximity detection. The associate proximity detection includes steps to identify an associate based on at least one of the context of the authentication request or the physical location of the user, determine a physical location of the identified known associate, and determine a proximity of the user to the identified known associate. The authentication request may be approved when the determined proximity is within a threshold.

21 Claims, 7 Drawing Sheets

(51) Int. Cl.
*H04W 4/02* (2018.01)
*G06Q 50/00* (2012.01)
*H04W 12/06* (2009.01)
*H04W 4/21* (2018.01)
*H04W 4/029* (2018.01)

(56) References Cited

U.S. PATENT DOCUMENTS

| | | | |
|---|---|---|---|
| 9,380,411 B2 * | 6/2016 | Fuller | H04W 4/02 |
| 2003/0236926 A1 * | 12/2003 | Malville | G06F 9/465 |
| | | | 719/328 |
| 2009/0165125 A1 * | 6/2009 | Brown | G06F 21/31 |
| | | | 726/21 |
| 2009/0298514 A1 * | 12/2009 | Ullah | G01S 5/02 |
| | | | 455/456.5 |
| 2013/0031598 A1 * | 1/2013 | Whelan | G01S 1/725 |
| | | | 726/1 |
| 2015/0046969 A1 * | 2/2015 | Abuelsaad | G06F 21/41 |
| | | | 726/1 |
| 2015/0227924 A1 * | 8/2015 | Grigg | G06Q 20/382 |
| | | | 705/64 |
| 2015/0229650 A1 | 8/2015 | Grigg et al. | |
| 2016/0012427 A1 * | 1/2016 | Van Heerden | H04L 63/0853 |
| | | | 705/44 |
| 2016/0212132 A1 * | 7/2016 | Banerjee | H04L 63/10 |
| 2016/0253487 A1 * | 9/2016 | Sarkar | H04L 63/08 |
| | | | 726/7 |
| 2017/0038847 A1 * | 2/2017 | Schorsch | G06F 3/017 |
| 2017/0180339 A1 * | 6/2017 | Cheng | H04L 63/08 |
| 2018/0032997 A1 * | 2/2018 | Gordon | G06Q 20/3224 |

* cited by examiner

SYSTEMS AND METHODS FOR PROXIMITY IDENTITY VERIFICATION

PRIORITY CLAIM

This application claims priority under 35 U.S.C. § 119 to U.S. provisional patent application No. 62/370,094 filed on Aug. 2, 2016, and titled "Systems and Methods for Proximity Identity Verification," the disclosure of which is incorporated herein by reference in its entirety.

TECHNICAL FIELD

The disclosed embodiments generally relate to systems and methods for remotely verifying a user identity, more particularly, systems and methods for verifying a user's identity based on a determined proximity of the user to another "trusted" or associated user.

BACKGROUND

In today's digital age, systems and computing applications are increasingly geared to solutions enabling convenient and remote access to sensitive information and performance of sensitive transactions. A key technical challenge for many such systems and applications is the ability to verify the identity or authenticity of the user provided with the remote capabilities. Capabilities for more reliably verifying a user's identity are increasingly becoming critical features of most digital platforms, enterprise networks, cloud services, websites, apps, etc. and even end-user devices, such as smartphones that may themselves contain sensitive information.

The most common form of authentication today is the requirement for a username and/or password. Some systems also include supplementary or alternative techniques, such as a requirement to answer security questions, to supply additional credentials such as a certificate or token, or to supply a one-time code received by the user in in an out-of-band message, such as via text or e-mail, or as generated based on a secret key, for example. Other additional or alternative techniques may include a requirement for biometric information, such as a fingerprint, facial recognition, etc.

These techniques, however, are vulnerable and may overburden the end user. For example, passwords, shared secrets, and some biometric information are vulnerable to replication or fraudulent discovery, such as may be learned through data theft, social engineering, eavesdropping, or other criminal acts. Thus, these techniques alone, may not be satisfactory.

Traditional supplementary techniques are also known to create friction for valid users by making the authentication process slower and more cumbersome to complete, often requiring additional user-involved steps as part of the authentication process. Typical authentication processes also do not discriminate between certain user actions for which additional authentication steps may be beneficial considering the risk or frequency involved. Thus, it is desired to provide improved authentication processes to increase confidence in verifying a user's identity based on information not easily discoverable or replicated, and while not overburdening the user with additional user-involved authentication steps.

SUMMARY

In the following description, certain aspects and embodiments of the present disclosure will become evident. It should be understood that the disclosure, in its broadest sense, could be practiced without having one or more features of these aspects and embodiments. It should also be understood that these aspects and embodiments are merely exemplary.

The present disclosure provides systems and methods improving upon conventional techniques for authenticating a user of a computing device. In particular, the disclosed embodiments include systems and methods for authenticating a user based on not easily replicated information identifying a physical location of the user as compared to physical location information of one or more "trusted" associates or other associates known to the user. Additional aspects of the disclosed embodiments are set forth below in this disclosure.

The disclosed embodiments include an exemplary system that comprises one or more memory devices storing instructions, and one or more processors configured to execute the instructions to receive an authentication request from a user of a computing device, determine a context of the authentication request, determine physical location information of the user, and perform, based on the context of the authentication request and the physical location information of the user, an associate proximity detection. The associate proximity detection includes steps to identify a known associate based at least in part on at least one of the context of the authentication request or the physical location information of the user, determine physical location information of the identified known associate, determine a proximity of the user to the identified known associate, based on a comparison of the physical location information of the user and the physical location of the identified known associate, and provide a result signal indicating whether the determined proximity is within a threshold parameter. The authentication request may be approved based on the result signal.

In the disclosed embodiments, receiving an authentication request comprises receiving, via an application executed on the computing device, an action request including the authentication request. Receiving an authentication request may also comprise receiving a user request to access information stored on the computing device, the user request including the authentication request.

Also, in the disclosed embodiments, the identified known associate is an associate predesignated by the user. Identifying the known associate may comprise identifying a known associate from a social network of the user. Identifying the known associate may also comprise identifying the known associate from among a plurality of associates listed in the social network, based on a predetermined relationship with the context of the authentication request, wherein the context of the authentication request comprises a geographic location.

In the disclosed embodiments, determining the physical location information of the user comprises determining network access information of at least one of an Internet access point or a cellular communication signal. Determining the physical location information of the user may also comprise analyzing social network activity of the user, and determining the physical location information of the identified known associate comprises analyzing social network activity of the identified known associate.

The disclosed embodiments also include a computing device operated by a user. The computing device comprises one or more memory devices storing instructions, and one or more processors configured to execute the instructions to identify an action requested by a user of the computing device, determine a context of the action, based at least in part on a physical location of the computing device, identify physical location information of the computing device, and perform, based on the context of the action, an associate proximity detection. The associate proximity detection includes steps to identify a known associate based at least in part on at least one of the context of the action or the physical location of the computing device, determine a physical location of the identified known associate, and determine a proximity of the user to the identified known associate, based on a comparison of the physical location of the computing device and the physical location of the identified known associate. The processors are also configured to approve the action when the determined proximity is within a threshold predetermined for the associate proximity detection.

In the disclosed embodiment, the one or more processors are configured to determine the physical location of the identified known associate based on a wireless communication between the computing device and a device associated with the identified known associate.

The disclosed embodiments include a computer-implemented method for authenticating a user of a computing device. The method comprises receiving an authentication request from a user of a computing device, determining a context of the authentication request, determining a physical location of the user, determining, based on the context of the authentication request and the physical location of the user, an associate proximity detection. The associate proximity detection includes steps to identify a known associate based at least in part on at least one of the context of the authentication request or the physical location of the user, determine a physical location of the identified known associate, and determine a proximity of the user to the identified known associate, based on a comparison of the physical location of the computing device and the physical location of the identified known associate. The method also includes approving the authentication request when the determined proximity is within a threshold predetermined for the associate proximity detection.

The disclosed embodiments also include a system for authorizing a transaction. The system comprises one or more memory devices storing instructions, and one or more processors configured to execute the instructions to receive a request to authorize a transaction initiated by a user, determine that an indicator of relative risk associated with the transaction exceeds a first predetermined threshold, the relative risk being based at least in part on a current physical location of the user, identify a known associate of the user based at least in part on the authorization request, determine a proximity between the current physical location of the user and a current physical location of the identified known associate, and approve the authorization request when the determined proximity is within a second predetermined threshold.

In the disclosed embodiment, receiving the authorization request comprises receiving an authorization request from an application executed on a computing device associated with the user. Also, the identified known associate is an associate predesignated by the user, and may be predesignated by the user for transactions meeting a predetermined relative risk criteria, and predesignated by the user for transactions occurring during a predetermined limited duration of time.

In the disclosed embodiment, identifying a known associate comprises identifying a known associate from a social network of the user. The known associate may be identified from among a plurality of associates listed in the social network of the user, based on a geographical relationship between a current physical location of the identified known associate and the current physical location of the user. Also in the disclosed embodiment, determining a proximity between the current physical location of the user and a current physical location of the identified known associate comprises determining the proximity based on a known fixed location of a computing device used by the user to initiate the transaction. Determining the current physical location of the user comprises analyzing activity of the user on a social network, and determining the current physical location of the identified known associate comprises analyzing activity of the identified known associate on a social network.

In the disclosed embodiment, the processors are configured to determine the indicator of relative risk associated with the authentication request based on at least one of the current physical location of the user, a history of physical location information of the user, or a history of transactions requested by the user. The processors are also configured to determine the second predetermined threshold based on the current physical location of the user, or based on the identified known associate.

The disclosed embodiments also include a computing device operated by a user. The device comprises one or more memory devices storing instructions, and one or more processors configured to execute the instructions to receive a user request to perform a transaction using the computing device, determine that an indicator of relative risk associated with the transaction exceeds a first predetermined threshold, the relative risk being based at least in part on a current physical location of the user, identify a known associate of the user based at least in part on the indicator of relative risk, determine a proximity between the current physical location of the user and a current physical location of the identified known associate, and approve the transaction when the determined proximity is within a second predetermined threshold.

In the disclosed embodiment, the processors are configured to determine the current physical location of the user based on a known fixed location of the computing device, and determine the second predetermined threshold based on the current physical location of the user.

The disclosed embodiments also include a computer-implemented method for authorizing a transaction. The method comprises receiving a request to authorize a transaction initiated by a user, determining that an indicator of relative risk associated with the transaction exceeds a first predetermined threshold, the relative risk being based at least in part on a current physical location of the user, identifying a known associate of the user based at least in part on the authorization request, determining a proximity between the current physical location of the user and a current physical location of the identified known associate, and approving the authorization request when the determined proximity is within a second predetermined threshold.

Consistent with additional embodiments of the present disclosure, a computer-readable medium is disclosed that stores instructions that, when executed by a processor(s), causes the processor(s) to perform operations consistent with one or more disclosed methods.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Figure 1:
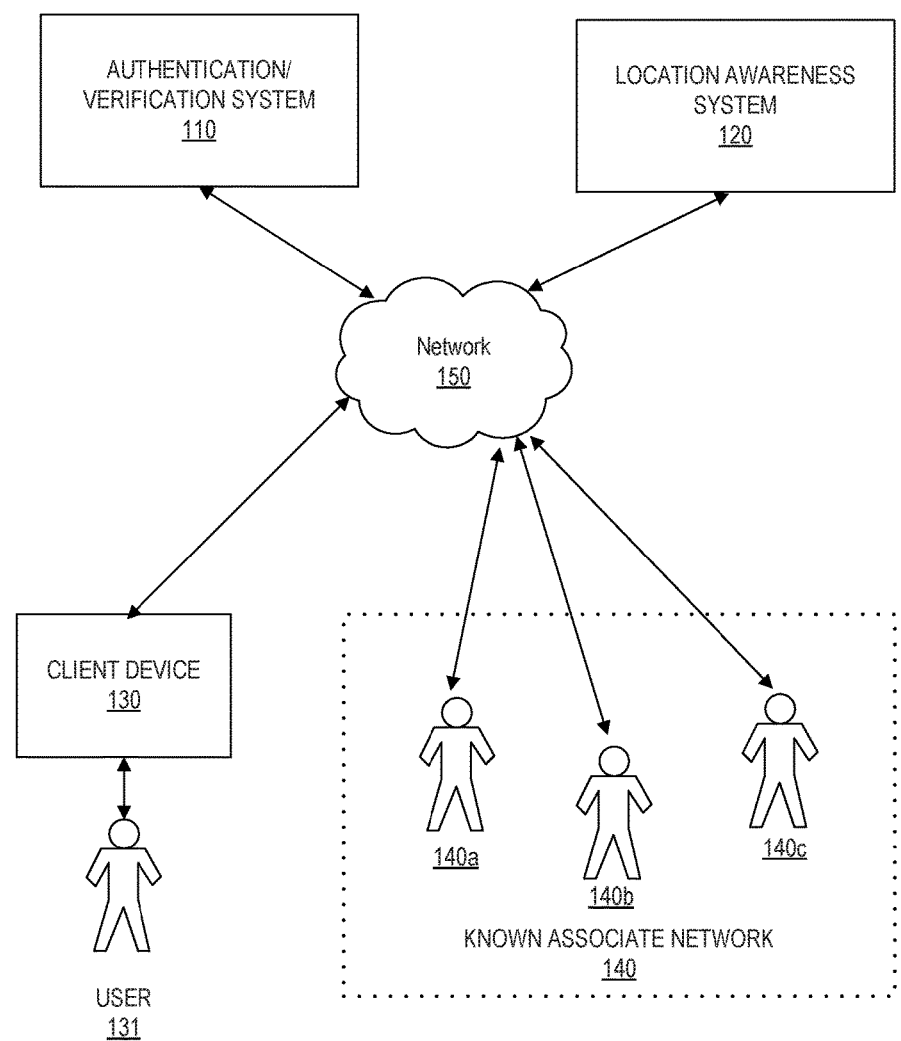
FIG. 1 is a block diagram of an exemplary system, consistent with the disclosed embodiments.

Reference will now be made in detail to exemplary embodiments, examples of which are illustrated in the accompanying drawings and disclosed herein. Wherever convenient, the same reference numbers will be used throughout the drawings to refer to the same or like parts.

Conventional authentication systems aim to prevent fraudulent use of a user's credentials (e.g., credit card, debit card, username/password, etc.) using measures designed to verify the purported user's identity. Conventional authentication systems, however, rely on static information that is susceptible to fraudulent discovery or replication. Because capabilities for "spoofing" or falsifying one's location data are known, such as by using programs on a mobile device or Software Defined Radios, for example, merely examining a user's location information may not be sufficiently secure. Thus, other techniques are desired to increase confidence in verifying a user's identity based on information not easily discoverable or replicated.

The present disclosure describes advanced technical solutions for verifying a user's purported identity based in part on a determined ever-changing physical location of a user and a determined proximity of the user to one or more other "trusted" persons or persons known to be associated with the user. In the disclosed embodiments, a "trusted" person may include any individual that is designated as being associated with the user or determined to be associated with the user with a sufficiently close relationship so as to enhance confidence in the disclosed authentication techniques. The determination of a proximity or co-location of a "trusted" person and a user reduces the likelihood of unauthorized use of the user's credentials and thereby aids in reducing fraud. Thus, by determining that a user to be authenticated is in sufficient proximity with a "trusted" person, the disclosed authentication techniques provide greater confidence in verifying that user's identity or the authorized use of the user's credentials.

The disclosed systems and methods provide technical solutions directed to improving confidence in verifying or authenticating a user that also overcome certain drawbacks in conventional remote authentication systems that are overly cumbersome for a user and accompany delays that are undesirable in the expected immediacy of user action authorization. The disclosed systems and methods, for example, may passively monitor a user's location and the location of one or more other persons designated as "trusted" associates or otherwise known to be associated with a user. In response to receiving an authentication (or authorization) request or other user action requiring authentication of a user, the disclosed systems and methods may determine whether a context of the authentication request meets any trigger parameters, thereby determining whether an authentication or authorization decision is to be based on the disclosed physical location proximity detection techniques. One or more trigger parameters may be based on any of several factors, such as the significance of the authentication or authorization request or user action, as well as any suspicious behaviors or identified deviations from learned behavior associated with the user or other established rules. In this manner, the improved systems conserve resources and promote efficient authentication by discriminating between certain user actions for which the advanced authentication techniques may be implemented.

The disclosed systems and methods may then determine whether to approve the authentication/authorization request based on a determined proximity (meeting a prescribed threshold) of the purported user's location and the location of a "trusted" associate or other known associate—dynamic information that is not susceptible to discovery like other conventional techniques. Detection of a user's location and the location of a "trusted" associate (and their proximity) may be determined using geolocation techniques based on communications of a computing device associated with the user or "trusted" associate, such as through the use of reported global positioning information, triangulation based on WiFi or cellular network access, detection of peer-to-peer communication, detection of a presence at a co-located computing device whose position is known etc. An authentication/authorization determination may be based on a physical location proximity result signal indicative of whether a proximity threshold is met. The "trusted" associate or other known associate may be determined based on one or more rules or contextual factors relating to the authentication/authorization request. Additionally, a proximity threshold may be determined based on the identity of the "trusted" associate or other known associate, as well as other factors similar to the trigger parameters described above. The received authentication/authorization request may then be approved, denied, or flagged for further processing based on the determined physical location proximity result signal.

The advanced technical solutions, therefore, evaluate a user's authentication/authorization request using dynamically detected physical location information of one or more "trusted" associates that may not be readily known or easily replicated by an unauthorized user, thereby improving upon conventional techniques that rely on static information susceptible to discovery or replication.

The disclosed authentication/verification techniques may be implemented for improving confidence in verifying or authenticating a user in a variety of authentication or authorization instances. In some embodiments, the disclosed authentication/verification techniques may be implemented to authorize a user request to make a purchase through a website, or to remotely access account information or other sensitive information using the Internet or other networks, for example. In other embodiments, the disclosed authentication/verification techniques may be implemented to authorize a transaction at a point of sale device associated with a merchant, or an ATM, for example. Numerous other embodiments are contemplated by the presented disclosure, which should not be limited by the particular examples disclosed herein. Generally, the disclosed authentication/verification techniques may be implemented in any embodiment in which a location of a purported user can be determined and compared with a determined location of one or more known associates of the user.

The disclosed embodiments may overcome drawbacks in conventional systems described herein, among others, because an authorization or authentication request may be approved without additional involvement on behalf of the user (other than perhaps the input of initial identity verification credentials) and without incorporating significant additional delays, such as those associated with additional out of band verification, or requiring responses to authorization questions, etc. Furthermore, physical location proximity is not something that may be easily spoofed by a fraudster, and is not the type of information that can be discovered using social engineering tactics, eavesdropping, data theft or other fraudulent discovery techniques of static identity verification information.

The following disclosure provides exemplary systems and methods for improving remote authentication and identity verification of a user based in part on a determination of a physical location of a purported user and a determined proximity to a physical location of one or more "trusted" or known associated persons.

FIG. 1 is a block diagram of an exemplary system 100 for performing one or more operations consistent with the disclosed embodiments. In some embodiments, system 100 may include one or more authentication/verification systems 110, one or more location awareness systems 120, one or more client devices 130, one or more users 131, a known associate network 140 including one or more known associates 140a-c, such as a "trusted" or "primary" associate 140a, "secondary" associate 140b, or "rule" based associate 140c, and a communication network 150. Components of system 100 may be configured to provide authentication or identity verification methods according to the disclosed embodiments.

In some embodiments, the disclosed authentication methods are used to authorize or authenticate a user 131 operating a client device 130 in response to an authorization or authentication request generated or transmitted by client device 130. Client device 130 may be a desktop computer, laptop, tablet, smartphone, multifunctional watch, pair of multifunctional glasses, tracking device, or any suitable device with computing capability. Client device 130 may be uniquely associated with user 131, such as for example, when client device 130 is a user's personal computing device. In some embodiments, client device 130 may be a computing device that is not uniquely associated with user 131, but is part of another system, such as a point-of-sale device at a merchant location or an automated teller machine (ATM) associated with a third-party or other publicly accessible computing device, for example. In some embodiments, client device 130 is associated with a fixed physical location or otherwise is capable of determining a present physical location or providing information to a system, such as location awareness system 120, from which the present physical location can be determined.

In some embodiments, client device 130 includes executable software instructions for performing certain aspects of the disclosed methods. In some embodiments, client device 130 includes executable software instructions provided as part of an application or app associated with a service provider, such as, for example, a merchant or a financial service provider for performing operations associated with a financial service account. In some embodiments, the disclosed authentication methods may be performed in association with a received transaction request or other authentication request enabled by the financial service application. Client device 130 is discussed in additional detail with respect to FIG. 3, below.

As further described herein, the disclosed identity authentication or verification methods may be used to approve an authentication/authorization request or authenticate or authorize a user 131 operating or interacting with client device 130. In some embodiments, the authentication/authorization request may be received as part of a user request to perform a transaction with a financial service provider or a merchant, or to access sensitive information either remotely or on the computing device, or for any purpose requiring authentication of a user. In some embodiments, the disclosed authentication methods may be implemented by an authentication/verification system 110 in conjunction with location awareness system 120. Authentication/verification system 110 and location awareness system 120 may coordinate to approve an authentication/authorization request based on a determined location of user 131 and a determined proximity to a physical location of one or more "trusted" or otherwise known associates 140a-c of a known associate network 140. The identity or set of any of associates 140a-c may be determined based on a predetermined designation, or learned from monitoring a user's location and action history, for example. In some embodiments, an associate may be designated as a "trusted" or "primary" associate 140a. A "trusted" associate may include, for example, individuals with known familial relationships (e.g., spouse, parent) or financial relationships (e.g., co-applicant or authorized user of a credit card). Such relationships may be accessible to authentication/verification system 110. A "primary" associate 140a may be an individual designated by the user, thus indicating a sufficient relationship with the user for enhancing confidence in the disclosed authentication techniques. A "secondary" associate 140b may be determined based on online social network relationships, common employer relationships, or other determined relationships based on deep learning neural network techniques, for example. In some embodiments, one or more of these exemplary relationships may also determine a "trusted" or "primary" associate. And a "rule" based associate 140c may be defined according to any predetermined rule or circumstance. In the disclosed embodiments, a physical location of user 131 and any one of associates 140a-c may be determined according to any number of techniques described in detail below. In some embodiments, physical location information is determined based a user's 131 interaction with client device 130 and an associate's 140a-c interaction with a similar computing device (not shown).

Authentication/verification system 110 may be associated with a standalone third party authentication service entity that provides remote, mobile, or other network or computing system security and authentication/authorization services. Additionally, or alternatively, authentication/verification system 110 may be associated with any entity desiring to authenticate or authorize a user and/or an authentication/authorization request, including a financial service entity that provides, maintains, manages, or otherwise offers financial services, a merchant (brick and mortar or web-based), a private enterprise network system, a cloud-based services system, or any system desiring to verify a user's identity for approving an action or providing access to sensitive information, etc.

While the disclosed systems and methods may be implemented by any entity with a need or purpose to authenticate persons regardless of industry, for ease of discussion, in some embodiments, the disclosed authentication methods may be described as implemented by a financial services entity for remotely authorizing a financial services transaction.

Location awareness system 120 may similarly be associated with a stand-alone third party location awareness system or entity for determining and maintaining location information for one or more users 131 and associates 140*a-c*. Location awareness system 120 may also be associated with authentication/verification system 110 and/or any entity or service provider desiring to remotely authenticate or authorize a user and/or an authentication/authorization request. In some embodiments, location awareness system 120 may be associated with one or more social networking application systems, or may be provided access to the one or more social networking application systems for monitoring a user's physical location based on the user's interactions with a social networking application.

Authentication/verification system 110 and location awareness system 120 may include one or more computing devices (e.g., computer(s), server(s), etc.), memory storing data and/or software instructions (e.g., database(s), memory devices, etc.), and other known computing components configured to perform the disclosed authentication methods. As described in further detail below with respect to FIG. 2, in some embodiments, the one or more computing devices may include one or more processors configured to execute software instructions stored on one or more memory devices to perform one or more authentication methods, location determination methods, or other operations consistent with the disclosed embodiments. The disclosed embodiments are not limited to any particular configuration of authentication/verification system 110, location awareness system 120 or system 100.

Authentication/verification system 110, location awareness system 120, and client device(s) 130 may be configured to communicate with each other and one or more other components of system 100 over a network 150 for performing the disclosed authentication and identity verification methods. Network 150 may comprise any type of computer networking arrangement configured to provide communications or exchange data, or both, between components of system 100. For example, network 150 may include any type of network (including infrastructure) that provides communications, exchanges information, and/or facilitates the exchange of information, such as the Internet, a private data network, a virtual private network using a public network, a Wi-Fi network, a LAN or WAN network, and/or other suitable connections that may enable information exchange among various components of system 100. Network 150 may also include a public switched telephone network ("PSTN") and/or a wireless cellular network. Network 150 may be a secured network or unsecured network. In some embodiments, one or more components of system 100 may communicate directly through a dedicated communication link(s).

It is to be understood that the configuration of the functional building blocks of system 100 have been defined herein for the convenience of the description. The components and arrangement of the components included in system 100 may vary. For example, in some embodiments, authentication/verification system 110 and location awareness system 120 may be implemented together as part of a single system. Additionally, in some embodiments, system 100 may include other components that perform or assist in the performance of one or more processes consistent with the disclosed authentication methods, such as components of a service providing entity. Alternatives (including equivalents, extensions, variations, deviations, etc., of those described herein) will be apparent to persons skilled in the relevant art(s) based on the teachings contained herein.

Figure 2:
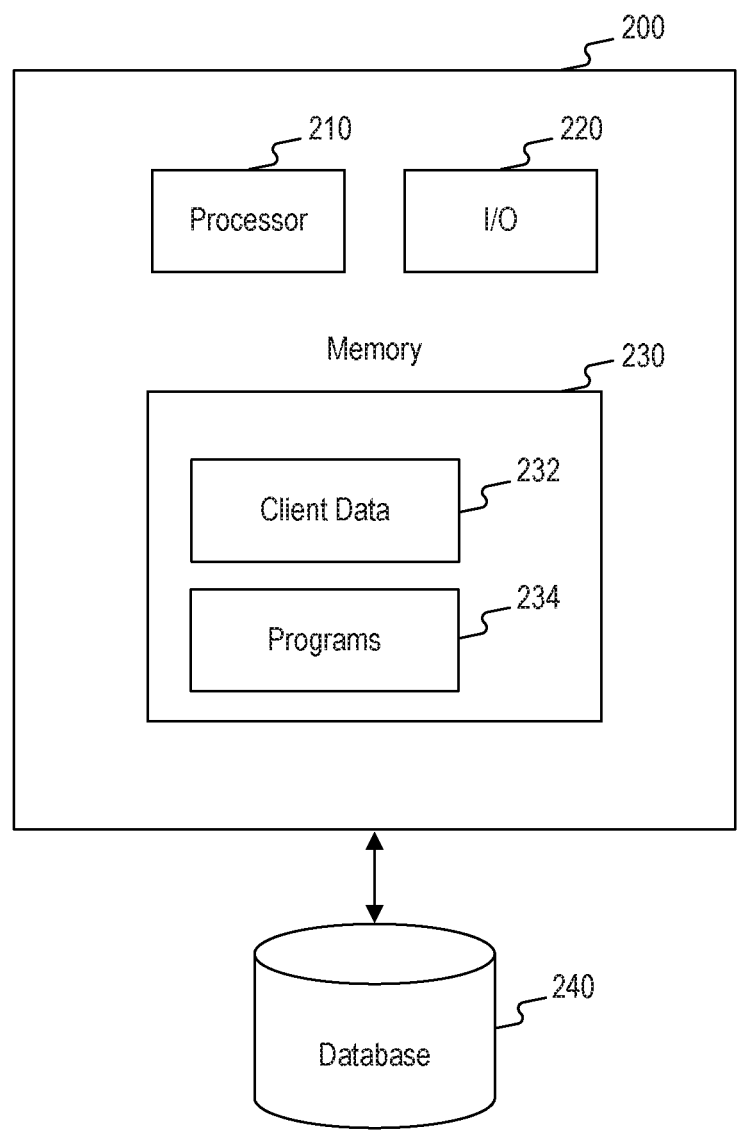
FIG. 2 is a block diagram of an exemplary computing system, consistent with the disclosed embodiments.

System 100 includes a number of components generally described as computing devices. Each of the computing devices may include any number of computing components particularly configured as a special purpose computing device to perform the functionality disclosed herein. FIG. 2 shows a diagram of an exemplary computing system 200 illustrating a computing system configuration that may be associated with authentication/verification system 110, location awareness system 120, or a client device 130, consistent with the disclosed embodiments.

FIG. 2 is a block diagram of an exemplary computing system 200 for performing certain aspects of the disclosed authentication methods. In one embodiment, computing system 200 may include one or more processors 210, one or more input/output (I/O) devices 220, and one or more memories 230. In some embodiments, computing system 200 may take the form of a server, special purpose computing device, a mainframe computer, laptop, smartphone, mobile device, ATM, point-of-sale device, or any combination of these or other computing components. In certain embodiments, computing system 200 (or a system including computing system 200) may be configured as a particular apparatus, system, and the like based on the storage, execution, and/or implementation of the software instructions that perform one or more operations consistent with the disclosed embodiments. Computing system 200 may be stand-alone, or it may be part of a subsystem, which may be part of a larger system. Computing system 200 may be a single server or may be configured as a distributed computer system including multiple servers or computers that interoperate to perform one or more of the processes and functionalities associated with the disclosed embodiments. Further, although sometimes described in relation to authentication/verification system 110, it should be understood that variations of computing system 200 may be used by other components of system 100, including location awareness system 120, and client device 130.

I/O devices 220 may be one or more devices configured to allow data to be received and/or transmitted by computing system 200. I/O devices 220 may include one or more digital and/or analog communication devices that allow computing system 200 to communicate (directly or over network 150) with other machines and devices, such as other components of system 100 shown in FIG. 1. Computing system 200 may also include interface components for one or more input devices, such as one or more keyboards, mouse devices, and the like, which may enable computing system 200 to receive input from an operator of authentication/verification system 110 or location awareness system 120. In some embodiments, such as when computing system 200 includes an ATM or a point-of-sale device (either fixed or mobile), for example, I/O devices 220 may include location determination components or capability, such as a Global Positioning System (GPS) interface, for determining a location of the computing system 200.

Processor 210 may include one or more known processing devices, such as a microprocessor from the Pentium™ or Xeon™ family manufactured by Intel™, the Turion™ family manufactured by AMD™, or any of various processors manufactured by Sun Microsystems, for example. Processor 210 may constitute a single core or multiple core processor that executes parallel processes simultaneously. For example, processor 210 may be a single core processor configured with virtual processing technologies. In certain embodiments, processor 210 may use logical processors to simultaneously execute and control multiple processes. Processor 210 may implement virtual machine technologies, or other known technologies to provide the ability to execute, control, run, manipulate, store, etc. multiple software processes, applications, programs, etc. In another embodiment, processor 210 may include a multiple-core processor arrangement (e.g., dual core, quad core, etc.) configured to provide parallel processing functionalities to allow computing system 200 to execute multiple processes simultaneously. One of ordinary skill in the art would understand that other types of processor arrangements could be implemented that provide for the capabilities disclosed herein. The disclosed embodiments are not limited to any type of processor(s) configured in computing system 200.

Memory 230 may include one or more storage devices configured to store instructions executable by processor 210 to perform functions related to the disclosed embodiments. Memory 230 may be a volatile or non-volatile, magnetic, semiconductor (e.g., EEPROM, flash memory, etc.), tape, optical, removable, non-removable, or other type of storage device or tangible (i.e., non-transitory) computer-readable medium.

In some embodiments, memory 230 may be configured with one or more software instructions, such as one or more program(s) 234 that, when executed by processor 210, perform the disclosed authentication or identity verification methods, as well as the disclosed location awareness methods or other functions. The disclosed embodiments are not limited to separate programs or computers configured to perform dedicated tasks. For example, memory 230 may include a program 234 that performs the functions of computing system 200, or program 234 could comprise multiple programs. Additionally, processor 210 may execute one or more programs located remotely from computing system 200. For example, authentication/verification system 110, location awareness system 120, or client device 130, may, via computing system 200 (or variants thereof), access one or more remote programs that, when executed, perform functions related to certain disclosed embodiments. Processor 210 may further execute one or more programs located in database 240. In some embodiments, programs 234 may be stored in an external storage device, such as a cloud server located outside of computing system 200, and processor 210 may execute programs 234 remotely.

Memory 230 may also store data that may reflect any type of information in any format that the system may use to perform operations consistent with the disclosed embodiments. For example, in some embodiments, memory 230 may store location data or other information corresponding to one or more users 131 and associates 140a-c identified as part of a known associate network 140, as well as authentication rules or associate maps for determining proximity detection parameters (described in detail below). Memory 230 may also store instructions to enable processor 210 to execute one or more applications, such as server applications, network communication processes, and any other type of application or software including software for performing operations associated with managing one or more financial service accounts. Alternatively, the instructions, application programs, etc., may be stored in an external storage (such as database 240) in communication with computing system 200 via network 150 or any other suitable network.

Computing system 200 may also contain one or more database(s) 240. Alternatively, computing system 200 may be communicatively connected to one or more database(s) 240. Computing system 200 may be communicatively connected to database(s) 240 through a direct connection and/or a network (e.g., network 150). Database 240 may include one or more memory devices that store information and are accessed and/or managed through computing system 200. By way of example, database(s) 240 may include Oracle™ databases, Sybase™ databases, or other relational databases or non-relational databases, such as Hadoop sequence files, HBase, or Cassandra. Database 240 may include computing components (e.g., database management system, database server, etc.) configured to receive and process requests for data stored in memory devices of database(s) 240 and to provide data from database 240.

In some embodiments, authentication/verification system 110 and location awareness system 120 may include the same or similar configuration and/or components of computing system 200. Computing system 200 when implemented in authentication/verification system 110 or location awareness system 120 may include any additional hardware and/or software installed therein necessary for performing certain aspects of the disclosed embodiments, such as for example, approving or authenticating a request based on credentials, such as a password, token or biometric data presented by a purported user, and accessing social network relationships of a user from other third party social network systems, etc. Other aspects performed by authentication/verification system 110 or location awareness system 120 inherent or implicit in the disclosed embodiments will be understood in view of the disclosure below. In some embodiments, certain aspects of the disclosed authentication methods may be performed by authentication/verification system 110 and other aspects performed by location awareness system 120.

Figure 3:
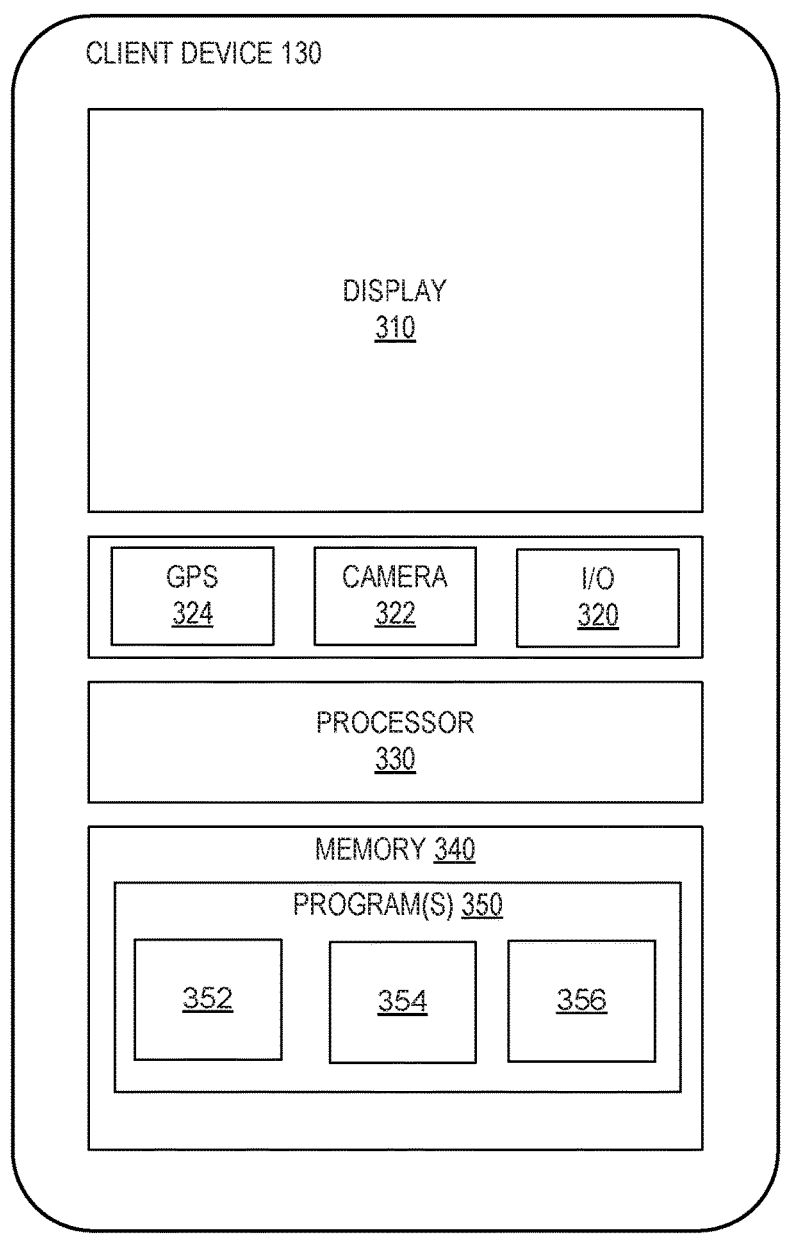
FIG. 3 is a block diagram of an exemplary client device, consistent with the disclosed embodiments.

Additionally, in some embodiments, aspects of the disclosed authentication/authorization methods may also be performed by a client device 130 operated by or associated with a user 131. FIG. 3 shows an exemplary configuration of client device 130, consistent with disclosed embodiments. Client device 130 may enable a user to operate client device 130 to perform remote or mobile banking or e-commerce transactions, for example, or any other operations that may require remote authentication of user 131, such as a request to remotely access sensitive information. Client device 130 may also be configured to authorize a user action on the device according to the disclosed embodiments, such as a request to access secured information on client device 130. In some embodiments, client device 130 may be a personal computing device. For example, client device 130 may be a smartphone, a laptop or notebook computer, a tablet, or any mobile device with computing capability, or any combination of these computers and/or affiliated components. In some embodiments, client device 130 may be a computer system that is associated with a merchant or other service provider, such as a point of sale system or an ATM etc. Client device 130 may include any arrangement of one or more computing devices configured to perform one or more operations consistent with disclosed embodiments.

Client device 130 may include one or more processors configured to execute software instructions stored in memory, such as memory 340 included in client device 130. Client device 130 may include software that when executed by a processor (e.g., processor 330) performs known Internet-related communication, content display processes, financial service-related processes, etc. for a user of client device 130. For instance, client device 130 may execute browser or related mobile display software that generates and displays interfaces including content on a display device included in, or in communication with, client device 130. Client device 130 may be a mobile device that executes mobile device applications and/or mobile device communication software that allows client device 130 to communicate with authentication/verification system 110 or location awareness system 120 and other components over network 150, and generates and displays content in interfaces via a display device included in client device 130. The disclosed embodiments are not limited to any particular configuration of client device 130.

Client device 130 may be configured with storage that stores one or more operating systems that perform known operating system functions when executed by one or more processors. By way of example, the operating systems may include Microsoft Windows™, Unix™, Linux™, Android™, Apple™ Computers type operating systems, or other types of operating systems. Accordingly, embodiments of the disclosed invention may operate and function with computer systems running any type of operating system. Client device 130 may also include communication software that, when executed by a processor, provides communications with network 150, such as Web browser software, tablet or smart handheld device networking software, etc.

Client device 130 may include a display 310 displaying information. Display 310 may include, for example, liquid crystal displays (LCD), light emitting diode screens (LED), organic light emitting diode screens (OLED), a touch screen, and other known display devices. Display 310 may display various information to user 131. For example, display 310 may display an interactive interface to user 131 enabling user 131 to operate client device 130 to perform certain aspects of the disclosed authentication methods. Display 310 may display touchable or selectable options for user 131 to select, and may receive user selection of options through a touch screen or I/O devices 320.

I/O devices 320 may include one or more devices that allow client device 130 to send and receive information from user 131 or another device. For example, I/O devices 320 may include various input/output devices, such as a keyboard, a mouse-type device, an accelerometer, an action sensor, a physical button, etc. I/O devices 320 may also include one or more communication modules (not shown) for sending and receiving information from other components in system 100 by, for example, establishing wired or wireless connectivity between client device 130 and network 150 and/or direct connectivity to a computing device (not shown) of a known associate 140a-c, authentication/verification system 110, and/or location awareness system 120. In some embodiments, client device 130 may include a camera 322 and/or a GPS unit 324. Camera 322 may include any device capable of capturing image data in the form of a single frame still image or a video image. In some embodiments, GPS unit 324 may enable client device 130 to determine physical location data that may be used to assist in the authentication of a user 131 operating client device 130. In some embodiments. I/O devices 320 may include a radio frequency, infrared, or other near-field communication interfaces, for communicating with one or more beacons, tags or other location enabling devices at a physical location, as well as for communicating with other devices associated with an associate 140a-c.

Client device 130 may include at least one processor 330, which may be one or more known computing processors, such as those described with respect to processor 210 in FIG. 2. Processor 330 may execute various instructions stored in client device 130 to perform various functions of the disclosed embodiments described in greater detail below.

Client device 130 may include a memory 340, which may be a volatile or non-volatile, magnetic, semiconductor, tape, optical, removable, non-removable, or other type of storage device or tangible (i.e., non-transitory) computer-readable medium. Memory 340 may store one or more programs 350. Programs 350 may include operating systems (not shown) that perform known operating system functions when executed by one or more processors. Disclosed embodiments may operate and function with computer systems running any type of operating system. Client device 130 may be a device that executes mobile applications for performing operations consistent with disclosed embodiments, such as a tablet or mobile device.

In some embodiments, client device 130 may have a software module including sets of instructions, such as a financial service application 352 installed thereon, for enabling client device 130 to communicate with a financial services entity, which may be associated with authentication/verification system 110, via network 150 and perform aspects of the disclosed authentication methods. For example, client device 130 may connect to authentication/verification system 110 and/or location awareness system 120 through use of browser software to access account information and perform certain transactions associated with a financial service account. In some embodiments, the disclosed authentication methods may be initiated in response to user interaction with a financial service application 352 executed on client device 130 or other authorization/authentication request generated or transmitted based on interaction with financial service application 352. Certain aspects of the disclosed authentication methods may be provided as part of financial service application 352 to authenticate user 131 prior to performing certain actions.

In some embodiments, programs 350 and/or financial service application 352 may include one or more additional software modules including sets of instructions for performing particular aspects of the authentication methods. For example, in some embodiments, programs 350 may include a trusted associate module 354 and one or more social network applications 356. According to some embodiments, trusted associate module 354 may include a set of instructions defining an interface for selecting or designating one or more persons as "trusted" or known associates, as well as enabling designation of rules or other parameters, as described with respect to FIG. 7 below. In some embodiments, the functionality associated with designating a person as a "trusted" associate may be provided by the financial service application 352, for example, or other proprietary application associated with a service provider. One or more social networking applications 356 may include a set of instructions defining an interface and providing functionality for interacting with a social network, such as a proprietary application associated with Facebook®, LinkedIn®, or Twitter®, for example. Programs 350 may also include other applications that provide location awareness functionality that may facilitate the gathering or determination of physical location information, such as, for example, a merchant application configured to interact with environmental location sensing devices etc., or other applications that enable a user to "check-in" at a particular location, etc.

In some embodiments, trusted associate module 354 and social networking applications 356 may be accessible to financial service application 352 to perform the disclosed authentication methods in association with a mobile or remote banking transaction.

The following processes are directed to various embodiments for improving confidence in authenticating a person, such as user 131, based on a determination of physical location proximity between the user and one or more other "trusted" or associated persons. The following processes may be performed by various aspects and components of system 100 as is apparent from the disclosure.

Figure 4:
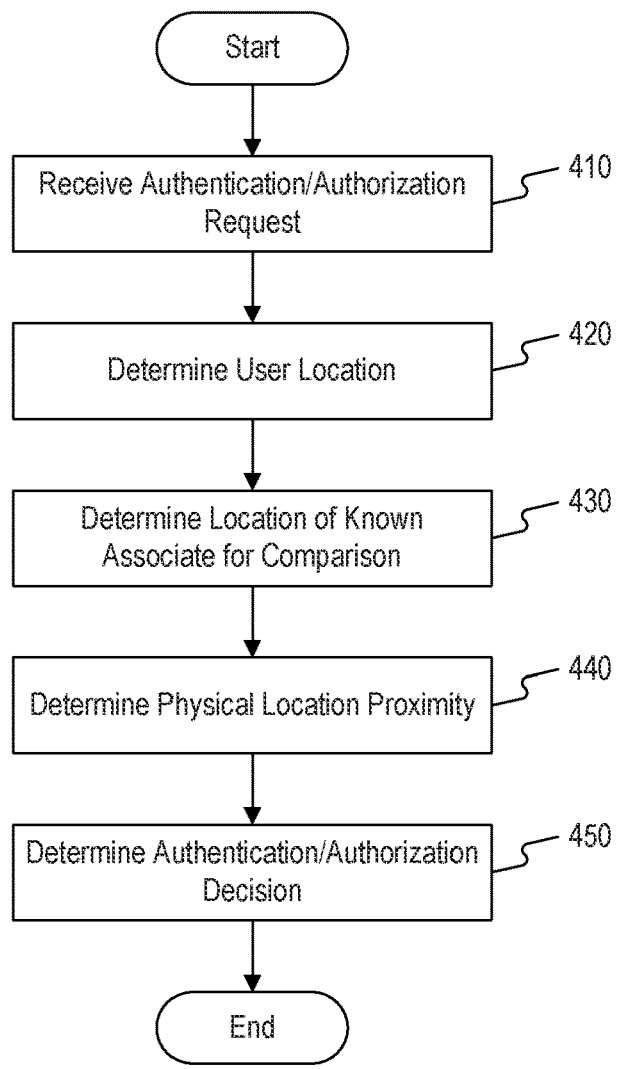
FIG. 4 is a flowchart of an exemplary authentication process, consistent with the disclosed embodiments.

FIG. 4 is a flowchart illustrating an exemplary authentication process 400 for authenticating a person or authorizing a request according to the disclosed embodiments.

Process 400 may be performed by an exemplary computing system, such as computing system 200, as part of authentication/verification system 110, for example, or a client device 130. In step 410, an exemplary system may receive an authentication or authorization request. An authentication/authorization request may be received from client device 130, via network 150, or any system or device capable of transmitting an authentication/authorization request or other request that may require authentication or authorization of a person. In some embodiments, the authentication/authorization request may be received by the client device 130 and may include a request to authenticate or authorize a user 131 of client device 130 for actions performed on or using the client device 130. The authentication/authorization request may also be received as part of any request for access to information, for performing a transaction, or for any action using client device 130 or for any other scenario where identity verification, authentication, or authorization of a person may be desired. In some embodiments, the request is generated by client device 130 based on user interaction with client device 130 or an application executed on client device 130. In some embodiments, as part of step 410, an exemplary computing system may also determine whether any received request, such as a request for a particular action, requires user authentication or authorization.

In some embodiments, an exemplary computing system may determine, based at least in part on the received request, whether a proximity detection process according to the disclosed embodiments is to be performed as part of an authentication process. Generally, a determination as to whether to perform an exemplary proximity detection process may be based on a context of the received request including a determined location of client device 130, or any predetermined rules. Additional details of exemplary embodiments are described below with respect to FIG. 5.

In step 420, an exemplary computing system may determine a physical location of a user 131 of client device 130 or other system that initiated the received authentication/authorization request of step 410. Physical location information may be determined according to any number of techniques, alone or in combination, for determining a physical location of user 131 and/or client device 130. In some embodiments, physical location information may be received from client device 130 as part of the authentication/authorization request. Physical location information may also be queried from client device 130 in another transmission, such as in response to receiving the authentication/authorization request, for example. Client device 130 may be configured to determine its physical location based on the functionality of GPS unit 324. In some embodiments, client device 130 may receive or determine location information based on radio frequency, infrared, or other near-field communications with one or more beacons, tags or other location enabling devices at a physical location. In some embodiments, client device 130 may be associated with a known fixed location, such as when client device 130 includes a brick and mortar point of sale device, or a stationary ATM, for example.

In some embodiments, physical location information of a user 131 and/or client device 130 may be queried from or otherwise received from location awareness system 120, either periodically or in response to a received request. Location awareness system 120 may be configured to access or receive location information in association with one or more social networking systems. Location awareness system 120 may be configured to monitor a user's location based on the user's social networking activities or other online activities. For example, a user's location may be determined based on the user's "checking-in" at a particular location or the user's posting of location specific information in a message or captured image on one or more social networking sites.

In some embodiments, physical location information may be determined by authentication/verification system 110 or location awareness system 120 based on any information received from client device 130 or other systems capable of determining a physical location of client device 130. For example, in some embodiments a user's physical location may be determined based on communication network signals of an Internet or other network access point, or the client device's communication with a cellular tower, for example. Generally, any technique for determining physical location information of a user 131 and/or client device may be implemented according to a particular embodiment. In some embodiments, physical location information of a user 131 may be determined based on a peer to peer or direct connection with a known associate whose location is otherwise known or capable of being determined.

In the disclosed embodiments, physical location information may be determined passively, i.e., without active user involvement, unlike conventional out of band verification techniques. Thus, in the disclosed embodiments advanced authentication techniques may be applied without additional involvement on behalf of the user.

In step 430, an exemplary computing system may determine a physical location of a known associate 140a-c for comparison with the physical location of user 131. The physical location of a known associate 140a-c may be determined according to any manner described above with respect to step 420. In some embodiments physical location information of any number of known associates 140a-c may be determined for comparison with the location of user 131. In some embodiments, a particular known associate may be identified based on any number of relevant factors, such as a context of the request received in step 410 or the location of the user 131. In some embodiments, location information of a "primary" associate 140a, such as a partner or other family member, may be determined as a default rule as part of an authorization determination. In other embodiments, a particular known associate may be identified based on a predetermined rule. The location information of one or more known associates is information that may not be easily spoofed by a fraudster. An authentication/authorization based on such information therefore provides improved confidence over conventional out of band techniques. Additional discussion regarding identification of a relevant or required known associate for the comparison is provided below with respect to FIG. 6.

In step 440, an exemplary computing system may determine a physical location proximity between the determined physical location of user 131 and the determined physical location of any one or more known associate 140*a-c*. A resulting signal may be generated indicative of the result of the physical location proximity determination. In some embodiments, a physical location proximity determination may only be made with respect to particular known associates identified, for example, according to an embodiment described below with respect to FIG. 6. In other embodiments, a physical location proximity determination may be made with respect to any number of known associates until a proximity threshold is met.

Physical location proximity may be determined according to any technique known in the art. In some embodiments, the particular technique employed may depend on the nature and granularity of the physical location information determined in steps 420 and 430. In some embodiments, the determined physical location information may be converted into a common coordinate system or other related reference based on known geographic maps or other databases of location information. For example, determined physical information regarding a wireless network access point may be associated with a particular location or merchant, such as a coffee shop, whose physical address may be determined based on publicly accessible mapping systems or other databases of information, and then converted into a latitude and longitude coordinate for comparison with similar coordinates generated by a GPS system of a device associated with the user or known associate. Alternatively, latitude and longitude coordinates generated by a GPS system may be associated with a particular merchant location for comparison with merchant location information of the user or known associate determined based on environmentally aware beacons, for example.

The particular technique for determining physical location proximity may also be determined based on a determined proximity threshold. For example, when a threshold is required to be relatively close physically, a proximity determination technique should be chosen that is capable of detecting a proximity that meets the threshold. A physical location proximity may be associated with a unit of measurement based on the particular determination technique or the required threshold. For example, in some embodiments, location proximity may be determined by calculating a distance between user 131 and the determined physical location of any one or more known associate 140*a-c*. In other embodiments, physical location proximity may be determined by associating a particular physical location, such as a bank, or a mall, or a general geographic location, such as a park or neighborhood, or town, city, etc., with both user 131 and any one or more known associate 140*a-c*. Thus, in some embodiments, when it is determined that user 131 and any one or more known associate 140*a-c* are both located within the same mall, for example, a physical location proximity threshold may be met, although a calculated distance between user 131 and the one or more known associate 140*a-c* exceeds the threshold that may be applicable in other situations.

In step 450, an exemplary computing system may determine whether to authenticate or authorize the request received in step 410, based on a result of the physical location proximity determination of step 440, such as a resulting signal indicative of the result of the physical location proximity determination. An authentication/authorization decision may be based on a proximity threshold. A proximity threshold may be fixed, predetermined, or may be dynamically determined according to one or more factors, such as a context of the request received in step 410 or the location of the user 131 determined in step 420, as well as a degree of confidence of the identified known associate. For example, in general, a more sensitive authentication request may require a closer proximity threshold. And in some embodiments, an identified associate 140*a-c* that is "closer" to the user 131 may be able to satisfy a more relaxed threshold. However, the particular threshold may vary based on other additional factors, such as the nature of the particular location of user 131, whether it be in a crowded public area or in a residential location or an unusual (i.e., not common for a user) geographic location. Any number of other factors may also influence a proximity threshold, such as learned history of user actions, etc. In some embodiments, the proximity threshold may be determined according to step 550, described in detail below with respect to FIG. 5. By basing a proximity threshold on a context of the authentication request, for example, the disclosed embodiments may conserve computing resources such that the disclosed physical location proximity detection techniques aid in an authentication/authorization decision using computational resources commensurate with certain risks involved with the request, as described in detail below.

An authentication/authorization decision may include authorizing or denying a requested action or access to information according to the request received in step 410. In some embodiments, satisfaction of a required proximity threshold may be sufficient alone to authorize a received request. In other embodiments, satisfaction or failure to meet a proximity threshold may be part of an initial authentication process that is used to trigger one or more other authentication processes, such as any one of a number of traditional authentication practices. Thus, the physical location proximity determination techniques of the disclosed embodiments may be a standalone process or one used in conjunction with any one or more other authentication processes.

Figure 5:
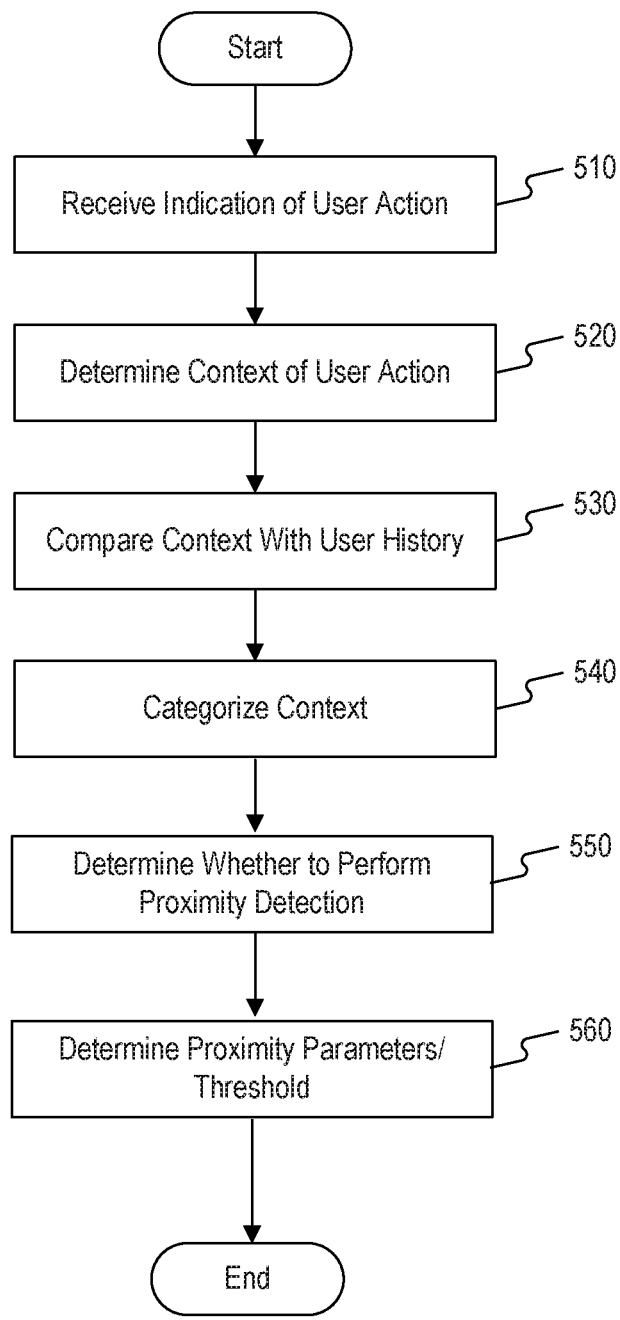
FIG. 5 is a flowchart of an exemplary authentication process, consistent with the disclosed embodiments.

FIG. 5 is a flowchart illustrating an example process 500 that may be performed by an exemplary computing system, such as computing system 200, as part of authentication/verification system 110, for example, or a client device 130. The exemplary operations of process 500 may be performed by one or more processors executing sets of instructions for controlling the operation of computing system 200 or client device 130. Process 500 may be performed as part of process 400 to determine whether a physical location proximity detection process may even be suitable with respect to a received authentication/authorization request or request for a user action.

Process 500 may begin with step 510 by receiving an indication of a user action similar to step 410 shown in FIG. 4. In some embodiments, for example, a user action may require an authentication or authorization decision or may be associated with an authentication/authorization request. As in step 410, the indication of user action of step 510 may be received by an exemplary computing system, such as computing system 200, as part of authentication/verification system 110, for example, or a client device 130. The indication of user action may be generated by client device 130 based on a user's interaction with client device 130 or an application executed on client device 130.

In step 520, an exemplary computing system may determine a context of the user action. And in step 530, a determined context may be compared with a history of user activity. In some respects, step 530 and step 520 are related. Each step contributes to a determination of total context for a user action. In step 520, a context may be determined based on the immediate user action, whereas in step 530, a context may be determined based on comparison with prior actions. The discussion of context determination below combines aspects of step 520 and 530.

In the disclosed embodiments, a context of the user action may be based on any number of factors, such as the nature of the action, either alone or in combination with one or more previous actions. A nature of the action, for example, may be a request to perform a payment or purchase transaction or access sensitive information, remotely or on the client device 130, or any other action of a sensitive nature or otherwise. The context may be based on a particular amount of a transaction or degree of sensitivity of a particular request. A context may be based on timing information, such as a frequency of the action or the time of day of the action. In some embodiments, a context of the action may be based on a particular location of the client device 130 at the time of the user action. The location may be determined as described with respect to step 420. In some embodiments, a context may be determined based on other activities, such as internet browsing activity, social networking activity, or purchase history, for example. In general, the disclosed embodiments are concerned with harvesting relevant information that may ultimately inform an authentication/verification decision. Patterns of user behavior with respect to location or time, frequency and nature of user action, travel activity, and social networking activity indicative of a user's relevant behavior, may each help generate a portrait that is characteristic of a user 131. In some embodiments, known neural network modeling and learned behavior techniques may be implemented to determine a context and to refine context determinations based on feedback.

In some embodiments, client device 130, authentication/verification system 110, or location awareness system 120 may passively monitor user actions performed by user 131 individually or with client device 130 to aid in a context determination. As part of step 530, one or more systems, such as client device 130, authentication/verification system 110, or location awareness system 120 may be queried for information that may aid in a context determination. In some embodiments, an exemplary system may create location/action history data records for a user and create user location/action maps defining associations and correlations between a user's activity and location information. These aspects are described in greater detail with respect to FIG. 6. In some embodiments, a context determination may be informed by a user's location/action map, and in turn a user's location/action map may be refined based on current context determinations.

In step 540, a context of the user action may be categorized based on the analysis of steps 520 and 530. A context based categorization scheme may be determined, for example based on relative risk of the user action, such as may be determined based on the sensitivity of a user action or the extent to which a user action deviates from known or expected user behaviors or other contexts that warrant performance of an exemplary proximity detection process described with respect to process 400. In some embodiments, a rank, score, or index on a scale may be applied to the user action indicative of a relative risk. In some embodiments, a value or other indication may be associated with the user action based on one or more predetermined rules or trigger parameters. In this embodiment, a rule based categorization scheme, alternative to or in addition to a context-based categorization scheme, may be based on any particular context characteristics defined by one or more rules or trigger parameters. In some embodiments, predetermined rules or trigger parameters may be defined based on a time of day, location, user's deviation from a location, particular user action, particular combination or frequency of user actions, etc. Any number of factors may be implemented in defining a predetermined rule or trigger parameter. Examples of predetermined rules or trigger parameters are described in greater detail with respect to FIGS. 6 and 7. In some embodiments, a categorization scheme may provide an indication of which of one or more trigger parameters or rules are met by the user action. Other techniques for categorizing a context of user action are also contemplated in the disclosed embodiments.

In step 550, an exemplary computing system may determine whether to perform a disclosed proximity detection process based on the categorized context of step 540. In some embodiments, proximity detection may be performed when a score associated with the categorized context meets or exceeds a threshold. In some embodiments, proximity detection may be performed based on a value or indication that the user action meets one or more predetermined rules or trigger parameters that require proximity detection to be performed. In some embodiments, as part of step 550, an exemplary computing system may determine to forego physical location proximity detection in lieu of one or more other authentication processes, or may determine that no additional authentication processes are warranted, and may indicate approval of the user action.

If a physical location proximity detection process is to be performed, as part of step 560, an exemplary computing system may determine one or more proximity parameters or proximity thresholds for use in steps 430, 440 and 450, described with respect to FIG. 4. For example, a proximity parameter may define or identify one or more known associates whose location is to be determined as part of an exemplary proximity detection process. As part of step 560, an exemplary computing system may also determine a proximity threshold to be applied to an exemplary proximity detection process based on the categorized context, one or more predetermined rules, or other factors. Additional details regarding the determination of proximity parameters and thresholds are described with respect to FIG. 6.

Figure 6:
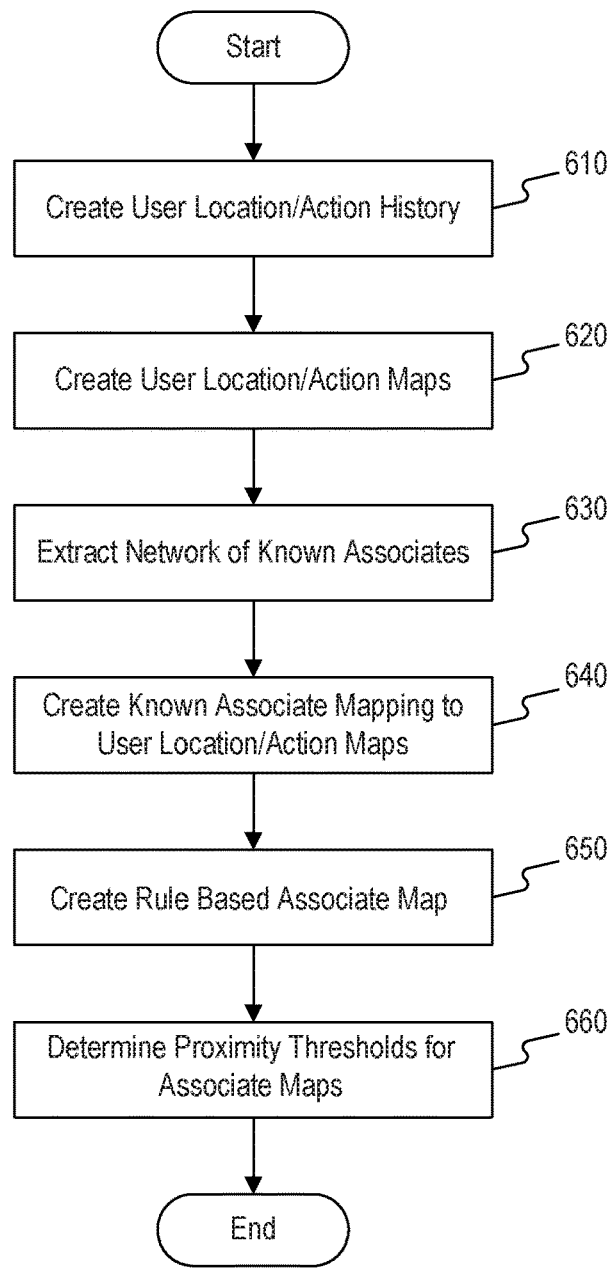
FIG. 6 is a flowchart of an exemplary proximity parameter determination process, consistent with the disclosed embodiments.

FIG. 6 is a flowchart illustrating an example process 600 that may be performed by an exemplary computing system, such as computing system 200, as part of authentication/verification system 110, for example, or a client device 130. The exemplary operations of process 600 may be performed by one or more processors executing sets of instructions for controlling the operation of computing system 200 or client device 130. Process 600 may be performed as part of processes 400 and 500, or in addition to those processes, to determine one or more proximity parameters or thresholds to be used in an exemplary physical location proximity detection process.

Process 600 may begin with step 610 in which an exemplary computing system creates a user location/action history. In step 610, one or more of client device 130, authentication/verification system 110, or location awareness system 120 may passively monitor user actions performed by user 131 individually or with client device 130. In some embodiments, the monitored actions may correspond to actions described above with respect to step 510 of process 500. Step 610 may also receive context information determined in step 520, such as a user's 131 or client device's 130 physical location information associated with a user action. Other information such as a time of day, nature of action etc. may also be captured in one or more user location/action history records generated as part of step 610.

In step 620, an exemplary computing system may create one or more user location/action maps that indicate associations and correlations of various user actions with location information or other context information. An exemplary location/action map may associate one or more actions with locations and/or timing information in a contextual manner to identify patterns of user behavior or expected behavior. In some embodiments, an exemplary location/action map may also incorporate other information such as that obtained from a user's purchase or transaction history or social networking interactions to inform a relevant location/action map, such as one that may define an expected upcoming trip, for example.

In step 630, an exemplary computing system may extract a network of known associates, such as "secondary" associates 140*b*. In some embodiments, a network of known associates may be determined based on information accessed from a user 131's social network activities. For example, in some embodiments, a user 131 may designate one or more social network applications, such as Facebook® or LinkedIn®, as a starting point for building a known associate network 140. In some embodiments, a user 131 may designate particular associates in their social networks to be included in an exemplary known associate network 140. In other embodiments, an exemplary computing system may determine, based on a user's social network interactions, a subset of known associates to be included in an exemplary known associate network 140. In some embodiments, a known associate network 140 may include others users of a corporate network, such as the employees of a firm or corporation etc.

In some embodiments, an exemplary computing system may be provided with access to location information for associates in a user's known associate network 140. In some embodiments, location awareness system 120 may be configured to monitor location information of a user's known associate network 140 as described above with respect to step 430 of process 400. In step 640, an exemplary computing system may create known associate mappings correlating with a user's location/action maps generated in step 620. For example, an exemplary computing system may determine correlations between one or more user location/action maps and location information of one or more known associates related to the user location/action map. For example, when a user 131's location/action map bears a correlation with a particular known associate's location information, that known associate may be mapped with the corresponding user location/action map. Some user location/action maps may thus become correlated with known associates indicative of a user's social activity, business activities, or family activities, based on corresponding patterns of behavior. In some embodiments, known associate mappings generated in step 640 may be used to identify one or more known associates whose location is to be determined with respect to step 430 of process 400.

In step 650, an exemplary computing system may create one or more rule based associate maps based on one or more predetermined rules or trigger parameters. In the exemplary embodiments, a rule or trigger parameter may be associated or linked with one or more known associates 140*a-c*. For example, a rule may be defined such that a user's 131 action with a particular determined risk, such as a financial transaction over $1000, is to be linked with a "primary" associate 140*a*, such as a user's 131 spouse or family member, or legal guardian etc. Thus, as part of an authorization process 400 for authorizing the user's 131 particular transaction, a physical location proximity determination will be made with respect to the linked "primary" associate 140*a* according to the rule. In other embodiments, a rule may be defined based on a particular location, so as to link a user 131 action at a location with a particular known associate, or any one of a group of associates. Other rules may be defined based on a time of the day, or other combinations of factors, as would be appreciated from the disclosed embodiments. In some embodiments, a rule may be defined based on all user actions or only particularly defined user actions. In some embodiments, one or more rules may be defined for a limited duration or purpose. In these embodiments, a rule based associate map may be generated to be enforceable for the corresponding duration of the rule.

In step 660, an exemplary computing system may determine a proximity threshold for each of the associate maps generated in steps 640 or 650. In some embodiments, a user 131 may designate a threshold to be associated with particular mappings or categories of mappings. In some embodiments, a threshold may be applied based on the "closeness" of the known associate or a degree of correlation between a known associate and a user location/action map. In some embodiments, a proximity threshold may be based on a characteristic of a determined location. In some embodiments, a proximity threshold may be applied based on a category of context determined in step 540, for example. In general, a proximity threshold may be determined based on any one or more factors relevant to verifying a user's identity with sufficient confidence considering the context of the user action or a defined rule or trigger parameter. The disclosed techniques for identifying a known associate and a proximity threshold based on correlations or designations between a user location/action and an associate mapping may therefore limit the computational resources needed while effectively verifying a user's identity with sufficient confidence.

Aspects of the above examples may be enabled using an interface of an application developed for download to mobile communications and computing devices, e.g., laptops, mobile computers, tablet computers, smart phones, etc. The applications may be made available for download by the user either directly from the device, through a website, or through a dedicated application store. An exemplary interface illustrating certain aspects of the disclosed methods is shown in FIG. 7.

Figure 7:
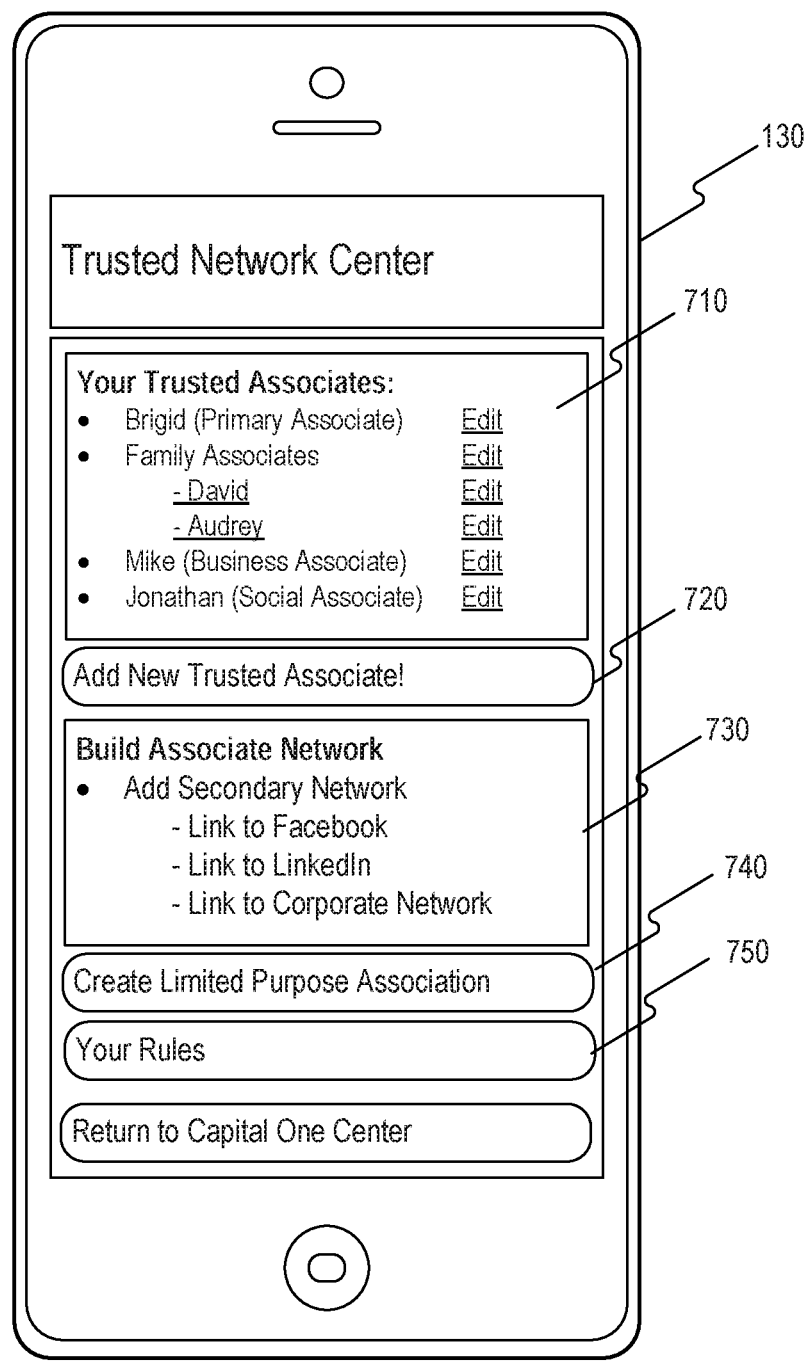
FIG. 7 illustrates an exemplary user device interface for defining an associate network, consistent with the disclosed embodiments.

FIG. 7 depicts an interface, according to some embodiments, that may be used to display a trusted network center on client device 130 that enables user 131 to view or edit "trusted" associates, define an associate network, establish rules or trigger parameters, etc. The interface may be provided on a client device 130, which according to the illustrated embodiment, may be a smartphone. The interface shown may be part of a financial services application 352, or may alternatively be part of trusted associate module 354 accessible to one or more other programs. An exemplary interface may include a plurality of windows or regions, some of which display information to the user of client device 130 and others and enable user 131 to provide an input.

As shown in FIG. 7, a first region 710 of an interface for client device 130 may include a window displaying a list of a user's "trusted" associates. In some embodiments, "trusted" associates may be defined based on one or more relationships with the user 131. For example, a particular "trusted" associate may be designated as a "primary" associate, whose location may be determined as a default rule. Other associates may be designated "family" associates, "business" associates, "social" associates etc. In some embodiments, the shown associates may be recommended to the user based on the known associate mappings created in step 640 of process 600. In other embodiments, the shown associates may have been predesignated by user 131. In some embodiments, associates designated with one or more categories, such as "family," "business," or "social," may automatically be associated with corresponding associate mappings as part of step 640. A user may be able to edit, change, or assign an associate's categorization by interacting with region 710.

A second region 720 may enable a user 131 to add a new "trusted" associate and apply one or more rules, categories or other trigger parameters with the "trusted" associate, resulting in creation of one or more rule based associate maps described above with respect to step 650. Region 730 may enable a user 131 to build an associate network by linking with one or more social networking accounts or other associate networks. Another region 740 may enable a user 131 to create a limited purpose association, such as a temporary rule. For example, in some embodiments, a user 131 may be able to associate a location for an upcoming trip with a particular associate accompanying the user. In this embodiment, a rule based associate map may be created linking the accompanying associate with the upcoming location. Region 750 may enable a user to view, add or modify any number of rules or trigger parameters.

The above disclosure associated with an exemplary interface is presented by way of example only. The features and functionality of the disclosed embodiments are not limited or defined by the functionality suggested by the illustrated interface.

The above described processes may be implemented as a computer program or application or as a plugin module or sub component of another application. Some of the described processes may be executed by a computing system 200 of authentication/verification system 110, location awareness system 120, client device 130 or other system components that may be provided as part of system 100. The described techniques may be varied and are not limited to the examples or descriptions provided.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of operations may be modified, and operations may be added or deleted. For example, in some embodiments, some of the steps may be performed as parallel operations. Other modifications are also contemplated.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language used in the claims and not limited to examples described in the present specification, which are non-exclusive. For example, aspects of the disclosed embodiments are described as being associated with data stored in memory, and one skilled in the art will appreciate that these aspects can be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead are defined by the appended claims in light of their full scope of equivalents.

What is claimed is:

1. A system for authenticating a user of a computing device, the system comprising:
   one or more memory devices storing instructions; and
   one or more processors configured to execute the instructions to:
      receive an authentication request from a user of a computing device;
      determine an indicator of relative risk associated with the authentication request;
      determine a context of the authentication request based on a most recent user action or a history of user activity;
      determine physical location information of the user;
      perform, based on the indicator of relative risk, the context of the authentication request, and the physical location information of the user, an associate proximity detection, the associate proximity detection including steps to:
         identify a known associate based at least in part on the context of the authentication request and the physical location information of the user;
         determine physical location information of the identified known associate based on a wireless communication between the user's computing device and a device associated with the identified known associate;
         determine a proximity of the user to the identified known associate, based on a comparison of the physical location information of the user and the physical location of the identified known associate; and
         provide a result signal indicating whether the determined proximity is within a threshold parameter; and
      approve the authentication request based on the result signal.

2. The system of claim 1, wherein receiving an authentication request comprises receiving, via an application executed on the computing device, an action request including the authentication request.

3. The system of claim 1, wherein receiving an authentication request comprises receiving a user request to access information stored on the computing device, the user request including the authentication request.

4. The system of claim 1, wherein the identified known associate is an associate predesignated by the user.

5. The system of claim 1, wherein identifying the known associate comprises identifying a known associate from a social network of the user.

6. The system of claim 5, wherein identifying the known associate comprises identifying the known associate from among a plurality of associates listed in the social network, based on a predetermined relationship with the context of the authentication request.

7. The system of claim 6, wherein the context of the authentication request comprises a geographic location.

8. The system of claim 1, wherein determining the physical location information of the user comprises receiving information from a global positioning system component of the computing device.

9. The system of claim 1, wherein determining the physical location information of the user comprises determining network access information of at least one of an Internet access point or a cellular communication signal.

10. The system of claim 1, wherein determining the physical location information of the user comprises analyzing social network activity of the user.

11. The system of claim 1, wherein determining the physical location information of the identified known associate comprises analyzing social network activity of the identified known associate.

12. The system of claim 1, wherein the relative risk is determined based on a sensitivity of an action by the user or an extent to which the user action deviates from known or expected user behaviors.

13. A computing device operated by a user, the device comprising:
   one or more memory devices storing instructions; and
   one or more processors configured to execute the instructions to:
      identify an action requested by a user of the computing device;
      determine an indicator of relative risk associated with the action;
      determine a context of the action, based at least on a most recent user action or a history of user activity and on a physical location of the computing device;
      perform, based on the indicator of relative risk and the context of the action, an associate proximity detection, the associate proximity detection including steps to:
         identify a known associate based at least in part on the context of the action and the physical location of the computing device;
         determine a physical location of the identified known associate based on a wireless communication between the user's computing device and a device associated with the identified known associate; and
         determine a proximity of the user to the identified known associate, based on a comparison of the physical location of the computing device and the physical location of the identified known associate; and
      approve the action when the determined proximity is within a threshold predetermined for the associate proximity detection.

14. The computing device of claim 13, wherein the action requested by the user of the computing device is an action to access information stored on the computing device.

15. The computing device of claim 13, wherein the one or more processors are configured to determine the physical location of the identified known associate based on a wireless communication between the computing device and a device associated with the identified known associate.

16. The computing device of claim 13, wherein the identified known associate is an associate predesignated by the user.

17. A computer-implemented method for authenticating a user of a computing device, the method comprising:
   receiving an authentication request from a user of a computing device;
   determining an indicator of relative risk associated with the authentication request;
   determining a context of the authentication request based on a most recent user action or a history of user activity;
   determining a physical location of the user;
   determining, based on the indicator of relative risk, the context of the authentication request, and the physical location of the user, an associate proximity detection, the associate proximity detection including steps to:
      identify a known associate based at least in part on the context of the authentication request and the physical location of the user;
      determine a physical location of the identified known associate based on a wireless communication between the user's computing device and a device associated with the identified known associate; and
      determine a proximity of the user to the identified known associate, based on a comparison of the physical location of the computing device and the physical location of the identified known associate; and
   approving the authentication request when the determined proximity is within a threshold predetermined for the associate proximity detection.

18. The computer-implemented method of claim 17, wherein receiving an authentication request comprises at least one of receiving, via an application executed on the computing device, an action request including the authentication request, or receiving a user request to access information stored on the computing device, the user request including the authentication request.

19. The computer-implemented method of claim 17, wherein identifying the known associate comprises at least one of identifying an associate predesignated by the user, identifying a known associate from a social network of the user, and identifying the known associated from among several known associates in the social network of the user, based on a predetermined relationship with the context of the authentication request.

20. The computer-implemented method of claim 17, wherein determining the physical location of the user comprises analyzing social network activity of the user.

21. The computer-implemented method of claim 17, wherein determining the physical location of the identified known associate comprises analyzing social network activity of the known associate.

* * * * *